(12) United States Patent  
Nakashima

(10) Patent No.: US 11,655,357 B2  
(45) Date of Patent: May 23, 2023

(54) MODIFIED NATURAL RUBBER, RUBBER COMPOSITION USING THE RUBBER, AND PNEUMATIC TIRE USING THE COMPOSITION

(71) Applicant: Toyo Tire Corporation, Itami (JP)

(72) Inventor: Daiki Nakashima, Itami (JP)

(73) Assignee: Toyo Tire Corporation, Itami (JP)

( * ) Notice: Subject to any disclaimer, the term of this patent is extended or adjusted under 35 U.S.C. 154(b) by 380 days.

(21) Appl. No.: 17/102,745

(22) Filed: Nov. 24, 2020

(65) Prior Publication Data

US 2021/0179824 A1 Jun. 17, 2021

(30) Foreign Application Priority Data

Dec. 13, 2019 (JP) .............................. JP2019-225589

(51) Int. Cl.
```
C08L 15/00    (2006.01)
B60C 1/00     (2006.01)
C08F 236/08   (2006.01)
C08L 7/00     (2006.01)
```

(52) U.S. Cl.
CPC ................ *C08L 15/00* (2013.01); *B60C 1/00* (2013.01); *C08F 236/08* (2013.01); *C08L 7/00* (2013.01)

(58) Field of Classification Search
CPC .......... C08L 15/00; C08L 7/00; C08F 236/08; C08F 136/08; C08C 19/04; C08C 19/22
See application file for complete search history.

(56) References Cited

U.S. PATENT DOCUMENTS

| | | | |
|---|---|---|---|
| 2011/0003911 A1 | 1/2011 | Yonemoto | |
| 2016/0053097 A1* | 2/2016 | Koda ...................... | B60C 1/00 524/526 |

FOREIGN PATENT DOCUMENTS

| | | |
|---|---|---|
| JP | 2011-195802 A | 10/2011 |
| JP | 2013-163759 A | 8/2013 |
| WO | 2009/104555 A1 | 8/2009 |

* cited by examiner

*Primary Examiner* — Alexander C Kollias  
(74) *Attorney, Agent, or Firm* — WHDA, LLP

(57) ABSTRACT

A modified natural rubber has a branching degree of 0.40 to 0.70 and includes a linking structure represented by formula (C), the linking structure having been formed by allowing polyisoprene, having a structure represented by formula (A) and/or formula (B), to bind in the structure to an amino compound having two or more primary amino groups:

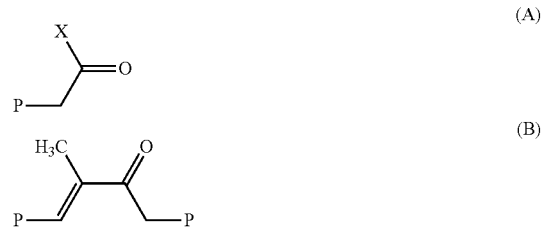

wherein X represents a hydrogen atom or a methyl group, and Ps, which may be the same or different from each other, represent a polyisoprene unit;

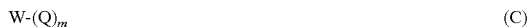

wherein W represents a residue obtained by removing amino end groups from the amino compound Q represents at least one selected from the group consisting of the following general formulae (Q-1) to (Q-4), and m represents 2 to 4;

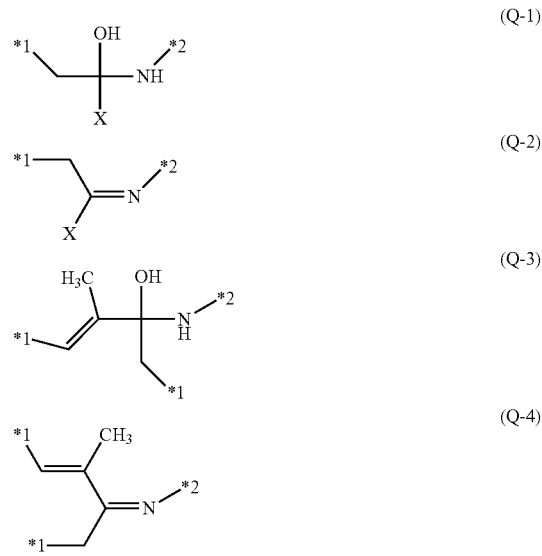

wherein *¹ indicates binding to a carbon atom of a polyisoprene unit, and *² indicates binding to a carbon atom of the residue represented by W.

17 Claims, No Drawings

MODIFIED NATURAL RUBBER, RUBBER COMPOSITION USING THE RUBBER, AND PNEUMATIC TIRE USING THE COMPOSITION

TECHNICAL FIELD

The present invention relates to a modified natural rubber, a rubber composition using the rubber, and a pneumatic tire using the composition.

BACKGROUND ART

Various means for enhancing the physical properties of a rubber polymer have been studied. For example, patent document 1, for the purpose of providing a rubber which can be produced at a low cost and which enhances the low loss performance and the abrasion resistance of a rubber composition containing the rubber, has proposed a modified diene rubber obtained by oxidizing a diene rubber latex, and then adding a hydrazide compound containing a polar group to the end of the molecular chain of the diene rubber.

Patent document 2, for the purpose of obtaining a polymer composition having excellent abrasion resistance, has proposed a conjugated diene polymer having a monomeric unit based on a conjugated diene, and a monomeric unit based on a monomer of a specific structure, having a benzene ring substituted e.g. with a nitrogen atom, at least one end of the polymer being modified with an organosilicon compound having a specific structure.

Patent document 3, for the purpose of enhancing the compatibility of a filler with a rubber component, has proposed a tire rubber composition containing a modified diene rubber having, in its molecule, a linking group having a specific structure, and comprising diene polymer chains linked via the linking group.

However, there is still room for improvement in the enhancement of the physical properties of a natural rubber polymer, especially in the enhancement of the low-fuel consumption performance and the tensile strength.

CITATION LIST

Patent Literature

Patent document 1: WO 2009/104555
Patent document 2: JP-A-2011-195802
Patent document 3: JP-A-2013-163759

SUMMARY OF THE INVENTION

Problems to be Solved by the Invention

It is therefore an object of the present invention to provide a modified natural rubber which is superior in the low-fuel consumption performance and the tensile strength to the unmodified natural rubber, a rubber composition using the modified natural rubber, and a pneumatic tire using the rubber composition.

Means for Solving the Problems

In order to achieve the object, the present invention provides a modified natural rubber having a branching degree of 0.40 to 0.70 and comprising a linking structure represented by the following general formula (C), the linking structure having been formed by allowing polyisoprene, having a structure represented by the following general formula (A) and/or general formula (B), to bind in the structure to an amino compound having two or more primary amino groups:

(A)

(B)

wherein X represents a hydrogen atom or a methyl group, and Ps, which may be the same or different from each other, represent a polyisoprene unit;

$$W\text{-}(Q)_m \quad (C)$$

wherein W represents a residue obtained by removing amino end groups from the amino compound, Q represents at least one selected from the group consisting of the following general formulae (Q-1) to (Q-4), and m represents 2 to 4;

(Q-1)

(Q-2)

(Q-3)

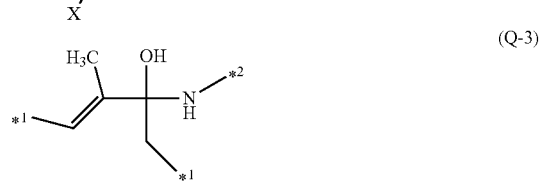

(Q-4)

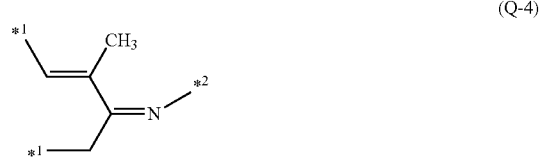

wherein $*^1$ indicates binding to a carbon atom of a polyisoprene unit, and $*^2$ indicates binding to a carbon atom of the residue represented by W.

The polyisoprene may have an absolute molecular weight of 200,000 to 600,000, and the modified natural rubber may have an absolute molecular weight of 1,000,000 to 3,000,000.

The amino compound may comprise an amino compound having three or more primary amino groups.

The amino compound may comprise tris(2-aminoethyl)amine.

The present invention also provides a rubber composition comprising 5 to 50 parts by mass of the above-described modified natural rubber in 100 parts by mass of a rubber component.

The present invention also provides a pneumatic tire produced using the rubber composition.

Advantageous Effects of the Invention

The present invention can provide a modified natural rubber which is superior in the low-fuel consumption performance and the tensile strength to the unmodified natural rubber, a rubber composition using the modified natural rubber, and a pneumatic tire using the rubber composition.

DESCRIPTION OF EMBODIMENTS

Embodiments of the present invention will now be described in detail.

A modified natural rubber according to an embodiment of the present invention has a branching degree of 0.40 to 0.70 and comprises a linking structure represented by the following general formula (C), the linking structure having been formed by allowing polyisoprene, having a structure of the following general formula (A) and/or general formula (B), to bind in the structure to an amino compound having two or more primary amino groups:

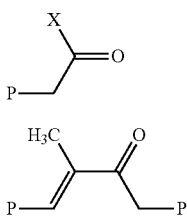

(A)

(B)

wherein X represents a hydrogen atom or a methyl group, and Ps, which may be the same or different from each other, represent a polyisoprene unit;

W-(Q)$_m$ (C)

wherein W represents the residue of the amino compound from which amino end groups are removed, and Q represents at least one selected from the group consisting of the following general formulae (Q-1) to (Q-4), and m represents 2 to 4;

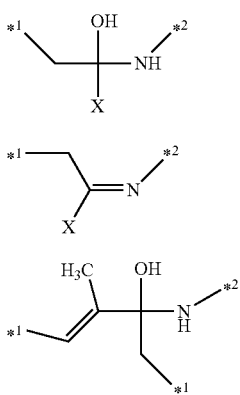

(Q-1)

(Q-2)

(Q-3)

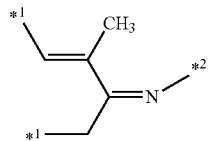

(Q-4)

wherein *$^1$ indicates binding to a carbon atom of a polyisoprene unit, and *$^2$ indicates binding to a carbon atom of the residue represented by W.

The branching degree of the modified natural rubber can be determined by measuring an RMS (Root Mean Square) radius with a multi-angle light scattering (MALS) detector for each of components separated by gel permeation chromatography (GPC), and substituting the measured value into the following equation:

Branching degree=(RMS radius(branched))$^2$/(RMS radius (linear))$^2$

There is no particular limitation on a method for producing the modified natural rubber according to this embodiment. A method may be used which comprises the steps of: adding an oxidizing agent to a natural rubber polymer to oxidize and cleave a carbon-carbon double bond, thereby obtaining an oxidatively decomposed natural rubber polymer; and adding an amino compound having two or more primary amino groups to the resulting oxidatively decomposed natural rubber polymer to cause it to undergo a recombination reaction. Thus, the modified natural rubber according to this embodiment can be obtained by decomposing a natural rubber polymer through oxidative cleavage of a carbon-carbon double bond existing in the main chain of the polymer, thereby decreasing the molecular weight, and causing a system containing the decomposed polymer to react with the amino compound, thereby recombining the polymer.

The natural rubber polymer to be modified may be one dissolved in a solvent, and it is preferred to use an aqueous emulsion in which a micellar polymer is dispersed in water which is a protic solvent, namely a latex. In the case of using an aqueous emulsion, after performing the decomposition of the rubber polymer, the amino compound can be added directly to the system to cause a recombination reaction. While there is no particular limitation on the concentration of the aqueous emulsion (the solid content concentration of the polymer), it is preferably 5 to 70% by mass, more preferably 10 to 50% by mass. If the solid content concentration is too high, the stability of the emulsion will be poor. If the solid content concentration is too low, the rate of the reaction will be unpractically low.

No particular limitation is placed on the amino compound as long as it has two or more primary amino groups. For example, it is possible to use a compound represented by the formula $NH_2(CH_2CH_2NH)_nH$ or the formula $N(CH_2CH_2NH_2)_3$, where n is preferably an integer of 1 to 4, more preferably an integer of 2 to 4. Thus, ethylenediamine, diethylene triamine, triethylene tetraamine, tetraethylene pentaamine, and tris(2-aminoethyl)amine can be preferably used. Among them, tris(2-aminoethyl)amine is more preferred.

The natural rubber polymer is decomposed by the above-described oxidative cleavage to obtain a polymer having a carbonyl group (>C=O) or a formyl group (—CHO) at the end of the molecular chain. In particular, a polymer having a structure represented by the following formula (A) at the end of the molecular chain and a polymer having a structure represented by the following formula (B) in the molecular chain are produced. As used herein, polyisoprene unit refers to polyisoprene derived from a natural rubber, in particular to cis-1,4-polyisoprene.

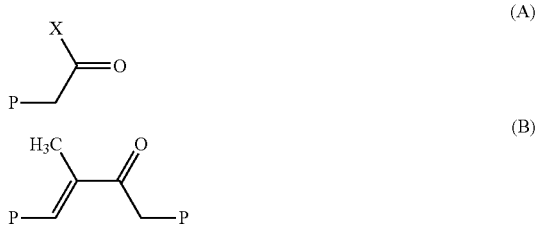

In the formula (A), X represents a hydrogen atom or a methyl group. When a polyisoprene unit is cleaved, X is a methyl group at one cleaved end, and X is a hydrogen atom at the other cleaved end.

An oxidizing agent can be used to oxidize and cleavage a carbon-carbon double bond of the natural rubber polymer. For example, a carbon-carbon double bond can be oxidized and cleaved by adding an oxidizing agent to an aqueous emulsion of the natural rubber polymer and stirring the aqueous emulsion. Examples of the oxidizing agent include a manganese compound such as potassium permanganate or manganese oxide, a chromium compound such as chromic acid or chromium trioxide, a peroxide such as hydrogen peroxide, a perhalogenic acid such as periodic acid, and an oxygen species such as ozone or oxygen. Among them, periodic acid is preferably used. A metallic oxidation catalyst, e.g., a chloride of a metal such as cobalt, copper or iron, or a salt or complex of such a metal with an organic compound, may be used together with the oxidizing agent. For example, the natural rubber polymer may be air-oxidized in the presence of the metallic oxidation catalyst.

The molecular weight of the natural rubber polymer decreases through its decomposition by the oxidative cleavage. While there is no particular limitation on the absolute molecular weight of the polymer after decomposition, it is preferably 200,000 to 600,000, more preferably 250,000 to 600,000. The amount of functional groups after recombination can be adjusted by the molecular weight of the polymer after decomposition. When the molecular weight of the polymer after decomposition is too low, a binding reaction is likely to occur in the same molecule. The absolute molecular weight, as used herein, refers to a value as measured with a multi-angle light scattering (MALS) detector for each of components separated by gel permeation chromatography (GPC).

After decomposing the polymer in the above-described manner, the reaction system containing the decomposed polymer is reacted with the amino compound to recombine the polymer. After completion of the recombination reaction, the aqueous emulsion is coagulated and dried to obtain a modified natural rubber which is solid at room temperature. The obtained modified natural rubber includes a linking structure represented by the above formula (C) introduced by the recombination reaction into the main chain thereof, thereby including the main chain structure thus modified.

In particular, a primary amino group of the amino compound undergoes a nucleophilic addition reaction with a carbonyl group or a formyl group in the structure represented by the general formula (A) to form a linking structure represented by the general formula (Q-1). When a dehydration reaction then occurs, the linking structure changes to a linking structure represented by the general formula (Q-2). A primary amino group of the amino compound undergoes a nucleophilic addition reaction with a carbonyl group in the structure represented by the general formula (B) to form a linking structure represented by the general formula (Q-3). When a dehydration reaction then occurs, the linking structure changes to a linking structure represented by the general formula (Q-4).

Thus, the modified natural rubber of this embodiment has, in the molecule, at least one linking structure represented by the formula (C), and has a structure in which polyisoprene chains, comprising repeating isoprene units, are directly linked via the linking structure(s).

While there is no particular limitation on the content of the linking structure represented by the general formula (C) (when the polymer has two or more types of linking structures, the content refers to the total content of the linking structures), it is preferably 0.1 to 1.0 mol %, more preferably 0.1 to 0.7 mol %, and even more preferably 0.1 to 0.6 mol %. As used herein, the content of the linking structure refers to the ratio of the number of moles of the linking structure to the number of moles of all the constituent units constituting the modified natural rubber, and is a value as measured by NMR. NMR spectra were measured with "Ultrashield 400 Plus", manufactured by Bruker, using TMS as a standard.

While there is no particular limitation on the absolute molecular weight of the modified natural rubber, it is preferably 1,000,000 to 3,000,000, more preferably 1,100,000 to 2,800,000. The recombination of the oxidatively decomposed natural rubber polymer increases the molecular weight, leading to increased entanglement of the molecular chains and increased tensile strength.

According to this embodiment, the oxidative cleavage reaction can be controlled by adjusting the type and the amount of the oxidizing agent which is an agent for cleaving a double bond, the reaction time, etc. The binding reaction can be controlled by adjusting the amount of the amino compound used for the recombination, the reaction time, etc. Such controls enable control of the molecular weight of the modified natural rubber. Thus, the absolute molecular weight of the modified natural rubber can be set to be equal to that of the original polymer, or to be lower than that of the original polymer.

While there is no particular limitation on the amount of the oxidizing agent, it is preferably 0.1 to 1.0 parts by mass, more preferably 0.2 to 0.5 parts by mass per 100 parts by mass of the natural rubber polymer (solid content).

While there is no particular limitation on the amount of the amino compound, it is preferably 0.01 to 1.0 mol, more preferably 0.1 to 0.5 mol per mol of the oxidatively decomposed natural rubber polymer.

Upon the decomposition and recombination of the main chain of the polymer, the linking structure represented by the formula (C), as a structure different from the main chain, is introduced into the main chain, whereby the polymer is functionalized at a binding point between segments of the main chain structure. That is, since the highly-reactive structure is introduced into the main chain of the molecule, the properties of the original polymer can be changed. Thus, this embodiment is not to effect grafting, direct addition or ring-opening to the natural rubber, but to change the main chain structure itself, and can introduce a functional group into the main chain structure in a simple manner.

In particular, due to a change in interaction (intermolecular force, polarity and reactivity) between the modified natural rubber polymer and a filler, and a change in the composition of the polymer, the compatibility of the polymer with the filler or the dispersibility of the filler is enhanced, resulting in enhancement of the low-fuel consumption performance.

A rubber composition according to this embodiment may additionally contain, as a rubber component, a diene rubber other than the above-described modified natural rubber. There is no particular limitation on the type of the additional rubber. Examples may include unmodified natural rubber (NR), isoprene rubber (IR), butadiene rubber (BR), styrene-butadiene rubber (SBR), styrene-isoprene copolymer rubber, butadiene-isoprene copolymer rubber, and styrene-isoprene-butadiene copolymer rubber. These diene rubbers may be used either singly or as a mixture of two or more kinds thereof.

While there is no particular limitation on the content of the modified natural rubber in 100 parts by mass of the rubber component in the rubber composition according to this embodiment, it is preferably 10 to 50 parts by mass, more preferably 10 to 40 parts by mass, and even more preferably 10 to 30 parts by mass.

A reinforcing filler, such as carbon black or silica, can be used as an inorganic filler in the rubber composition according to this embodiment. Silica may be used either singly or in combination with carbon black. It is preferred to use a combination of carbon black and silica. While there is no particular limitation on the content of the inorganic filler, it is preferably 10 to 150 parts by mass, more preferably 20 to 100 parts by mass, and even more preferably 30 to 80 parts by mass per 100 parts by mass of the rubber component.

While there is no particular limitation on the silica, wet silica, produced by a wet precipitation method or a wet gel method, is preferably used. From the viewpoint of a balance of tan 5 of the rubber, the reinforcing effect, etc., the content of silica is preferably 10 to 150 parts by mass, more preferably 15 to 100 parts by mass, and even more preferably 20 to 80 parts by mass per 100 parts by mass of the rubber component.

When the rubber composition contains silica, the rubber composition may further contain a silane coupling agent such as sulfide silane or mercaptosilane. When the rubber composition contains a silane coupling agent, its content is preferably 2 to 20 parts by mass per 100 parts by mass of silica.

There is no particular limitation on the carbon black; various known types of carbon black can be used. The content of carbon black is preferably 1 to 70 parts by mass, more preferably 1 to 30 parts by mass per 100 parts by mass of the rubber component.

In addition to the above-described components, the rubber composition according to this embodiment may further contain additives commonly used in the rubber industry, such as a process oil, zinc flower, stearic acid, a softener, a plasticizer, wax, an antioxidant, a vulcanizing agent and a vulcanization accelerator, in an appropriate amount.

Examples of the vulcanizing agent include sulfur components such as powdered sulfur, precipitated sulfur, colloidal sulfur, insoluble sulfur and highly dispersible sulfur. The content of the vulcanizing agent is preferably 0.1 to 10 parts by mass, more preferably 0.5 to 5 parts by mass per 100 parts by mass of the rubber component. The content of the vulcanization accelerator is preferably 0.1 to 7 parts by mass, more preferably 0.5 to 5 parts by mass per 100 parts by mass of the rubber component.

The rubber composition according to this embodiment can be produced by using a common mixing machine such as a Banbury mixer, a kneader or rolls.

The rubber composition obtained can be used for tires. In particular, the rubber composition can be used for pneumatic tires for various applications and having various sizes, such as tires for cars and large tires for trucks and buses, and can be applied in various portions, including a tread portion and a side wall portion, of such a tire. A pneumatic tire can be produced by molding the rubber composition into a predetermined shape by a common method such as extrusion and, after combining it with other parts, subjecting it to a vulcanization/molding process e.g. at 140 to 180° C.

There is no particular limitation on the type of a pneumatic tire according to this embodiment. As described above, the pneumatic tire can be exemplified by various types of tires including tires for cars and heavy-load tires for trucks and buses.

EXAMPLES

The following examples illustrate the present invention and are not intended to limit the scope of the invention.

The following measurements were performed on modified diene rubbers.

[Absolute Molecular Weight (Mw)•Branching Degree]

For each of molecular-weight components separated by gel permeation chromatography (GPC), the absolute molecular weight and the PMS radius were determined by using a multi-angle light scattering (MALS) detector. In particular, 10 mg of a measurement sample was immersed in 10 mL of THF and allowed to stand for one week, and the supernatant liquid was used. Using "LC-20A" manufactured by Shimadzu Corporation, the sample was passed through a filter and then passed through a column ("GPC KF-807L× 2", manufactured by Showa Denko K.K.) at a temperature of 40° C. and at a flow rate of 1.0 mL/min, followed by detection with "DAWN 8+" available from Shoko Science Co., Ltd. The RMS radius value obtained was substituted into the following equation to determine the branching degree:

$$\text{Branching degree} = (\text{RMS radius(branched)})^2/(\text{RMS radius (linear)})^2$$

Synthesis Example A: Synthesis of Oxidatively Decomposed Natural Rubber 1

0.5 g of potassium persulfate and 0.34 g of trisodium phosphate were added to 100 g of a polymer in a natural rubber latex having a high ammonia content ("HA-NR" manufactured by Regitex Co., Ltd.), whose DRC (dry rubber content) had been adjusted to 30% by mass, and the latex was stirred at 30° C. for 3 hours to obtain an oxidatively decomposed natural rubber 1. The absolute molecular weight of the oxidatively decomposed natural rubber 1 was 590,000.

Synthesis Example B: Synthesis of Oxidatively Decomposed Natural Rubber 2

An oxidatively decomposed natural rubber 2 was produced in the same manner as in Synthesis Example A except for changing the reaction temperature to 60° C. The absolute molecular weight of the oxidatively decomposed natural rubber 2 was 250,000.

Synthesis Example 1: Synthesis of Modified Natural Rubber 1 (Recombination Reaction Step)

8.8 g (0.15 mol) of ethylenediamine was added to 100 g (1.5 mol) of the polymer in the oxidatively decomposed natural rubber 1 obtained in Synthesis Example A, and the latex was stirred at 30° C. for 2 hours. Subsequently, the reaction solution was poured into methanol to coagulate the reaction solution. The solid matter was vacuum-dried to obtain modified natural rubber 1. The modified natural rubber 1 had an absolute molecular weight of 1,200,000 and a branching degree of 0.79.

Synthesis Examples 2 and 3: Synthesis of Modified Natural Rubbers 2 and 3 (Recombination Reaction Step)

Modified natural rubbers 2 and 3 were produced in the same manner as in Synthesis Example 1 except for using, instead of ethylenediamine, tris(2-aminoethyl)amine in an amount shown in Table 1. The absolute molecular weight and the branching degree of each of the rubbers 2 and 3 are shown in Table 1.

Synthesis Examples 4 and 5: Synthesis of Modified Natural Rubbers 4 and 5 (Recombination Reaction Step)

Modified natural rubbers 4 and 5 were produced in the same manner as in Synthesis Examples 2 and 3, respectively, except for using the oxidatively decomposed natural rubber 2 instead of the oxidatively decomposed natural rubber 1. The absolute molecular weight and the branching degree of each of the rubbers 4 and 5 are shown in Table 1.

Unmodified NR: the natural rubber latex having a high ammonia content "HA-NR", manufactured by Regitex Co., Ltd.
Modified natural rubber 1: the modified natural rubber 1 synthesized in Synthesis Example 1
Modified natural rubber 2: the modified natural rubber 2 synthesized in Synthesis Example 2
Modified natural rubber 3: the modified natural rubber 3 synthesized in Synthesis Example 3
Modified natural rubber 4: the modified natural rubber 4 synthesized in Synthesis Example 4
Modified natural rubber 5: the modified natural rubber 5 synthesized in Synthesis Example 5
Silica: "Nipsil AQ" manufactured by Tosoh Silica Corporation (BET=200 $m^2/g$)
Carbon black: "SEAST 3" manufactured by Tokai Carbon Co., Ltd.
Silane coupling agent: Bis(3-triethoxysilylpropyl)tetrasulfide "Si69" manufactured by Evonik Japan Co., Ltd.
Zinc flower: "Zinc Flower Type 1" manufactured by Mitsui Mining & Smelting Co., Ltd.
Process oil: "X-140" manufactured by Japan Energy Corporation
Antioxidant: "NOCRAC 6C" manufactured by Ouchi Shinko Chemical Industrial Co., Ltd.
Stearic acid: "LUNAC S-20" manufactured by Kao Corporation
Sulfur: "Powdered sulfur for rubber 150 mesh" manufactured by Hosoi Chemical Industry Co., Ltd.
Vulcanization accelerator: "NOCCELER CZ" manufactured by Ouchi Shinko Chemical Industrial Co., Ltd.

For each of the rubber compositions obtained, the low-fuel consumption performance and the tensile strength were evaluated in the following manner.

TABLE 1

| | Synthesis Example A | Synthesis Example B | Synthesis Example 1 | Synthesis Example 2 | Synthesis Example 3 | Synthesis Example 4 | Synthesis Example 5 |
|---|---|---|---|---|---|---|---|
| Oxidatively decomposed natural rubber 1 (mol) | — | — | 1.5 | 1.5 | 1.5 | — | — |
| Oxidatively decomposed natural rubber 2 (mol) | — | — | — | — | — | 1.5 | 1.5 |
| Ethylenediamine (mol) | — | — | 0.15 | — | — | — | — |
| Tris(2-aminoethyl)amine (mol) | — | — | — | 0.15 | 0.45 | 0.15 | 0.45 |
| Absolute molecular Weight (ten thousand) | 59 | 25 | 120 | 158 | 270 | 131 | 204 |
| Branching degree | — | — | 0.79 | 0.67 | 0.52 | 0.70 | 0.44 |

Using a Banbury mixer and following the formulations (parts by mass) shown in Table 2 below, components other than a vulcanization accelerator and sulfur were first mixed in a non-productive mixing step (discharge temperature=150° C.), and then the vulcanization accelerator and sulfur were added to the mixture and mixing of the resulting mixture was performed in a productive mixing step (discharge temperature=90° C.), thereby preparing a rubber composition.

The following are details of the components listed in Table 2.

Low-fuel consumption performance: Using "Rheospectrometer E4000" manufactured by USM, a loss factor tan δ was measured under the conditions: frequency 50 Hz, static strain 10%, dynamic strain 2%, and temperature 60° C. The measured value is expressed as an index number relative to the value of Comparative Example 1 expressed as 100. The tan δ at 60° C. is generally used as an index of the low heat generation properties of a tire rubber composition. A higher index number indicates a lower tan δ, thus indicating that the rubber composition generates less heat, and therefore provides a tire having superior low-fuel consumption performance.

Tensile strength: A tensile test was performed according to JIS K 6251 (using a dumbbell-shaped No. 3 specimen) to measure a tensile strength at break. The measured value is expressed as an index number relative to the value of Comparative Example 1 expressed as 100. A higher index number indicates a higher and thus better tensile strength.

TABLE 2

|  | Comp. Ex. 1 | Comp. Ex. 2 | Ex. 1 | Ex. 2 | Ex. 3 | Ex. 4 |
|---|---|---|---|---|---|---|
| Unmodified NR | 100 | 70 | 90 | 80 | 80 | 80 |
| Modified natural rubber 1 | — | 30 | — | — | — | — |
| Modified natural rubber 2 | — | — | 10 | — | — | — |
| Modified natural rubber 3 | — | — | — | 20 | — | — |
| Modified natural rubber 4 | — | — | — | — | 20 | — |
| Modified natural rubber 5 | — | — | — | — | — | 20 |
| Silica | 50 | 50 | 50 | 50 | 50 | 50 |
| Carbon black | 10 | 10 | 10 | 10 | 10 | 10 |
| Silane coupling agent | 4 | 4 | 4 | 4 | 4 | 4 |
| Zinc flower | 2 | 2 | 2 | 2 | 2 | 2 |
| Process oil | 2 | 2 | 2 | 2 | 2 | 2 |
| Antioxidant | 2 | 2 | 2 | 2 | 2 | 2 |
| Stearic acid | 2 | 2 | 2 | 2 | 2 | 2 |
| Sulfur | 2 | 2 | 2 | 2 | 2 | 2 |
| Vulcanization accelerator | 1.5 | 1.5 | 1.5 | 1.5 | 1.5 | 1.5 |
| Low fuel consumption | 100 | 102 | 107 | 107 | 106 | 107 |
| Tensile strength | 100 | 100 | 105 | 108 | 102 | 108 |

The results are as shown in Table 2 above. As can be seen from comparison between Comparative Example 1 and Examples 1 to 4, the use of the modified natural rubber of the present invention can achieve excellent low-fuel consumption performance and tensile strength.

As can be seen from comparison of Comparative Example 1 with Comparative Example 2, the use of the modified natural rubber, having a branching degree which falls outside the predetermined range disclosed herein, cannot achieve an increase in the tensile strength.

INDUSTRIAL APPLICABILITY

A rubber composition using the modified natural rubber of the present invention can be used for various tires, such as tires for cars and tires for light trucks or buses.

What is claimed is:

1. A modified natural rubber having a branching degree of 0.40 to 0.70 and comprising a linking structure represented by the following general formula (C), the linking structure having been formed by allowing polyisoprene, having a structure represented by the following general formula (A) and/or general formula (B), to bind in the structure to an amino group of an amino compound having two or more primary amino groups:

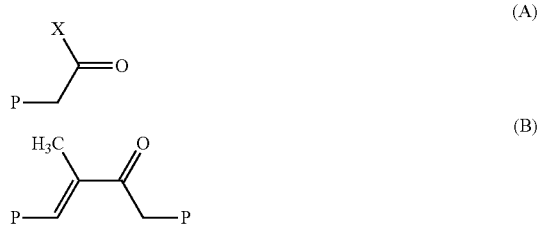

wherein X represents a hydrogen atom or a methyl group, and Ps, which may be the same or different from each other, represent a polyisoprene unit;

$$W-(Q)_m \quad (C)$$

wherein W represents a residue obtained by removing amino end groups from the amino compound Q represents at least one selected from the group consisting of the following general formulae (Q-1) to (Q-4), and m represents 2 to 4;

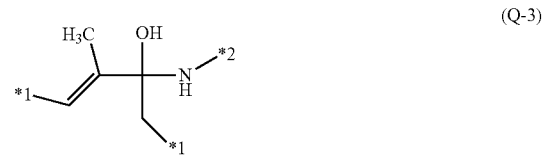

wherein $*^1$ indicates binding to a carbon atom of a polyisoprene unit, and $*^2$ indicates binding to a carbon atom of the residue represented by W.

2. The modified natural rubber according to claim 1, wherein the polyisoprene has an absolute molecular weight of 200,000 to 600,000, and the modified natural rubber has an absolute molecular weight of 1,000,000 to 3,000,000.

3. The modified natural rubber according to claim 2, wherein the amino compound comprises an amino compound having three or more primary amino group.

4. A rubber composition comprising 5 to 50 parts by mass of the modified natural rubber according to claim 3 in 100 parts by mass of a rubber component.

5. The modified natural rubber according to claim 3, wherein the amino compound comprises tris(2-aminoethyl)amine.

6. A rubber composition comprising 5 to 50 parts by mass of the modified natural rubber according to claim 5 in 100 parts by mass of a rubber component.

7. The modified natural rubber according to claim 2, wherein the amino compound comprises tris(2-aminoethyl)amine.

8. A rubber composition comprising 5 to 50 parts by mass of the modified natural rubber according to claim 7 in 100 parts by mass of a rubber component.

9. A rubber composition comprising 5 to 50 parts by mass of the modified natural rubber according to claim 2 in 100 parts by mass of a rubber component.

10. The modified natural rubber according to claim 1, wherein the amino compound comprises an amino compound having three or more primary amino groups.

11. A rubber composition comprising 5 to 50 parts by mass of the modified natural rubber according to claim 10 in 100 parts by mass of a rubber component.

12. The modified natural rubber according to claim 10, wherein the amino compound comprises tris(2-aminoethyl) amine.

13. A rubber composition comprising 5 to 50 parts by mass of the modified natural rubber according to claim 12 in 100 parts by mass of a rubber component.

14. The modified natural rubber according to claim 1, wherein the amino compound comprises tris(2-aminoethyl) amine.

15. A rubber composition comprising 5 to 50 parts by mass of the modified natural rubber according to claim 14 in 100 parts by mass of a rubber component.

16. A rubber composition composing 5 to 50 parts by mass of the modified natural rubber according to claim 1 in 100 parts by mass of a rubber component.

17. A pneumatic tire produced using the rubber composition according to claim 16.

\* \* \* \* \*